United States Patent [19]

Yamada et al.

[11] 4,238,233

[45] Dec. 9, 1980

[54] ALUMINUM ALLOY FOR CLADDING EXCELLENT IN SACRIFICIAL ANODE PROPERTY AND EROSION-CORROSION RESISTANCE

[75] Inventors: Kazuo Yamada, Mishima; Koji Mikami; Shigetake Imaizumi, both of Susono, all of Japan

[73] Assignee: Mitsubishi Aluminum Kabushiki Kaisha, Ohtemachi, Japan

[21] Appl. No.: 31,958

[22] Filed: Apr. 19, 1979

[51] Int. Cl.$^3$ .............................................. C22C 21/10
[52] U.S. Cl. ........................................ 75/146; 148/32
[58] Field of Search ........................ 75/146, 141, 140; 148/32

[56] References Cited

U.S. PATENT DOCUMENTS

| | | | |
|---|---|---|---|
| 2,184,693 | 12/1939 | Beck et al. ............................. | 75/146 |
| 4,141,725 | 2/1979 | Murai et al. ............................ | 75/146 |

OTHER PUBLICATIONS

Registration Record of International Alloy Designations and Chemical Composition Limits for Wrought Aluminum and Wrought Aluminum Alloys, Sep. 1, 1976, pp. 2, 5-7, The Aluminum Association, Inc.

*Primary Examiner*—R. Dean
*Attorney, Agent, or Firm*—Frishauf, Holtz, Goodman & Woodward

[57] ABSTRACT

An aluminum alloy for cladding excellent in sacrificial anode property and erosion-corrosion resistance, which consists essentially of, in weight percentage:
   Zinc: from 0.3 to 3.0%,
   Magnesium: from 0.2 to 4.0%,
   Manganese: from 0.3 to 2.0%,
   and,
   the balance aluminum and incidental impurities;

said alloy including an aluminum alloy also containing at least one element selected from the group consisting of, in weight percentage:
   Indium: from 0.005 to 0.2%,
   Tin: from 0.01 to 0.3%,
   and,
   Bismuth: from 0.01 to 0.3%;

provided that the total content of indium, tin and bismuth being up to 0.3%.

1 Claim, No Drawings

4,238,233

ALUMINUM ALLOY FOR CLADDING EXCELLENT IN SACRIFICIAL ANODE PROPERTY AND EROSION-CORROSION RESISTANCE

REFERENCE TO PATENTS, APPLICATIONS AND PUBLICATIONS PERTINENT TO THE INVENTION

As far as we know, prior documents pertinent to the present invention are as follows:

(1) "Registration Record of International Alloy Designations and Chemical Composition Limits for Wrought Aluminum and Wrought Aluminum Alloys" (revised as of Sept. 1, 1976), published by the Aluminum Association, Inc., on pages 2 to 7;

(2) The U.S. patent application Ser. No. 860,571 of Dec. 14, 1977, now U.S. Pat. No. 4,141,725, issued Feb. 27, 1979; and, (3) The U.S. patent application Ser. No. 910,212 of May 30, 1978, now U.S. Pat. No. 4,150,980 issued Apr. 24, 1979.

The prior arts disclosed in the above-mentioned prior documents will be commented on in the "BACKGROUND OF THE INVENTION" presented hereafter.

FIELD OF THE INVENTION

The present invention relates to an aluminum alloy for cladding excellent in erosion-corrosion resistance and sacrificial anode property.

BACKGROUND OF THE INVENTION

A pipe which is a component of a solar energy collector or a sea-water desalting unit, and a pipe which is a component of a heat exchanger such as a radiator of an engine or a condenser of a cooler (hereinafter generally referred to as a "pipe") are susceptible to corrosion by fresh water or sea-water flowing therethrough. As a means to prevent the above-mentioned corrosion of the pipe, a method is known, which comprises subjecting the pipe to a cathodic protection by cladding an aluminum alloy excellent in sacrificial anode property onto the inner surface of the pipe.

When a too high flow velocity of liquid flowing through the pipe causes a turbulence in the liquid, the inner surface of the pipe is rapidly corroded under the additional effect of mechanical damage caused by the liquid and corrosion caused by the liquid. Such a phenomenon is called erosion-corrosion. Therefore, an aluminum alloy to be cladded onto the inner surface of a pipe for the purpose of cathodic protection against an erosion-corrosion is required to be excellent not only in sacrificial anode property, but also in erosion-corrosion resistance.

The "Registration Record of International Alloy Designation and Chemical Composition Limits for Wrought Aluminum and Wrought Aluminum Alloys" (revised as of Sept. 1, 1976) published by the Aluminum Association, Inc., gives on pages 6 to 7 the following list of standards (hereinafter referred to simply as "AA"):

(1) AA 6253 Al alloy containing from 1.6 to 2.4 wt.% Zn, from 1.0 to 1.5 wt.% Mg, from 0.15 to 0.35 wt.% Cr, from 0.45 to 0.975 wt.% Si and others;

(2) AA 7003 Al alloy containing from 5.0 to 6.5 wt.% Zn, from 0.50 to 1.0 wt.% Mg, up to 30 wt.% Mn and others;

(3) AA 7039 Al alloy containing from 3.5 to 4.5 wt.% Zn, from 2.3 to 3.3 wt.% Mg, from 0.10 to 0.40 wt.% Mn, from 0.15 to 0.25 wt.% Cr and others;

(4) AA 7072 Al alloy containing from 0.8 to 1.3 wt.% Zn, up to 0.10 wt.% Mg, up to 0.10 wt.% Mn and others; and, (5) AA 7472 Al alloy containing from 1.3 to 1.9 wt.% Zn, from 0.9 to 1.5 wt.% Mg, up to 0.05 wt.% Mn and others.

Zinc (Zn) has an effect of improving sacrificial anode property of an aluminum alloy, whereas magnesium (Mg) and manganese (Mn) have an effect of improving erosion-corrosion resistance of an aluminum alloy. The aluminum alloy of the present invention therefore contains Zn, Mg and Mn as indispensable constituent elements as described later.

AA 6253 Al alloy, which contains Zn and Mg, also contains from 0.15 to 0.35 wt.% chromium (Cr) and from 0.45 to 0.975 wt.% silicon (Si) which make an anodic potential thereof noble. As a result, AA 6253 Al alloy is poor in sacrificial anode property.

In AA 7003 Al alloy, containing Zn and Mg, the Zn content is so high as from 5.0 to 6.5 wt.%, and Mn is contained in an amount of only up to 0.30 wt.% as an impurity. AA 7003 Al alloy is therefore insufficient in erosion-corrosion resistance.

AA 7039 Al alloy, although containing Zn, Mg and Mn, is poor in erosion-corrosion resistance because of the high Zn content of from 3.5 to 4.5 wt.% as in the above-mentioned AA 7003. Furthermore, AA 7039 Al alloy is also insufficient in sacrificial anode property since said alloy contains from 0.15 to 0.25 wt.% Cr which renders an anodic potential noble.

AA 7072 Al alloy is relatively high is sacrificial anode property because of the Zn content in an appropriate amount. However, AA 7072 is very poor in erosion-corrosion resistance since said alloy contains only up to 0.10 wt.% Mg and only up to 0.10 wt.% Mn as impurities.

AA 7472 Al alloy contains Zn and Mg in appropriate amounts. However, AA 7472 Al alloy is insufficient in sacrificial anode property since said alloy contains up to 0.25 wt.% Si which makes an anodic potential noble. Furthermore, AA 7472 Al alloy is insufficient also in erosion-corrosion resistance because of an Mn content of only up to 0.05 wt.% as an impurity.

In the U.S. patent application Ser. No. 860,571 of Dec. 14, 1977, now U.S. Pat. No. 4,141,725 there is described an aluminum alloy for sacrificial anode which consists essential of, in weight percentage:

Zinc: from 0.5 to 10.0%,
Indium: from 0.005 to 0.05%,
Calcium: from 0.005 to 0.5%,
Magnesium: from 0.1 to 4.0%,
and
the balance aluminum and incidental impurities;
said alloy including an aluminum alloy for sacrificial anode also containing at least one rare earth metal of from 0.001 to 0.05 wt.%.

The above-mentioned aluminum alloy shows an excellent sacrificial anode property even in low-temperature sea water. However, not only said alloy contains from 0.005 to 0.5 wt.% calcium (Ca) detrimental to erosion-corrosion resistance, but also no Mn is contained, leading to a problematic erosion-corrosion resistance.

In the U.S. patent application Ser. No. 910,212 of May 30, 1978, now U.S. Pat. No. 4,150,980 an aluminum alloy excellent in high-temperature sagging resistance and sacrificial anode property, which consists essentially of, in weight percentage:
Zinc: from 0.5 to 8.0%,
Manganese: from 0.5 to 1.5%,
and,
the balance aluminum and incidental impurities;
said alloy including an aluminum alloy excellent in high-temperature sagging resistance and sacrificial anode property, which also contains from 0.01 to 0.5 wt.% zirconium (Zr).

The aforementioned aluminum alloy shows an excellent sacrificial anode property and an excellent high-temperature sagging resistance. However, because of the absence of Mg, said alloy has a poor erosion-corrosion resistance.

Under such circumstances, there is a keen demand for the development of an aluminum alloy excellent not only in sacrificial anode property but also in erosion-corrosion resistance, which is adapted to be cladded onto the inner surface of a pipe for cathodic protection thereof.

SUMMARY OF THE INVENTION

An object of the present invention is therefore to provide an aluminum alloy excellent not only in sacrificial anode property but also in erosion-corrosion resistance.

A principal object of the present invention is to provide an aluminum alloy for cladding excellent in sacrificial anode property and erosion-corrosion resistance, which is adapted to be cladded onto the inner surface of a pipe susceptible to erosion-corrosion for cathodic protection thereof.

In accordance with one of the features of the present invention, there is provided an aluminum alloy for cladding excellent in sacrificial anode property and erosion-corrosion resistance, consisting essentially of, in weight percentage:
Zinc: from 0.3 to 3.0%,
Magnesium: from 0.2 to 4.0%,
Manganese: from 0.3 to 2.0%,
and,
the balance aluminum and incidental impurities;
said alloy including an aluminum alloy also containing at least one element selected from the group consisting of, in weight percentage:
Indium: from 0.005 to 0.2%,
Tin: from 0.01 to 0.3%,
and,
Bismuth: from 0.01 to 0.3%;
provided that the total content of indium, tin and bismuth being up to 0.3%.

DETAILED DESCRIPTION OF PREFERRED EMBODIMENTS

From the aforementioned point of view, we have carried out extensive studies with a view to obtaining an aluminum alloy for cladding excellent in sacrificial anode property as well as in erosion-corrosion resistance, adapted to be cladded onto the inner surface of a pipe for cathodic protection thereof. As a result, we found that an aluminum alloy consisting essentially of, in weight percentage:
Zinc: from 0.3 to 3.0%,
Magnesium: from 0.2 to 4.0%,
Manganese: from 0.3 to 2.0%,
and,
the balance aluminum and incidental impurities;
and also containing, as required, at least one element selected from the group consisting of, in weight percentage:
Indium: from 0.005 to 0.2%,
Tin: from 0.01 to 0.3%,
and,
Bismuth: from 0.01 to 0.3%,
provided that the total content of indium, tin and bismuth being up to 0.3%;
is excellent in sacrificial anode property and that a pipe cladded with said aluminum alloy on the inner surface thereof is not susceptible to erosion-corrosion even if a liquid flows therethrough at a high flow velocity.

Now, reasons why the chemical composition of the aluminum alloy of the present invention is limited as mentioned above are described below:

(1) Zinc:

Zinc (Zn) is known to have an effect of making an anodic potential of an aluminum alloy base and improving sacrificial anode property thereof.

However, with a Zn content of under 0.3 wt.%, it is impossible to impart a desired sacrificial anode property to the aluminum alloy. The Zn content should therefore be at least 0.3 wt.%. On the other hand, with a Zn content of over 3.0 wt.%, sacrificial anode property is improved according as the Zn content increases, whereas erosion-corrosion resistance worsens accordingly. The Zn content should therefore be up to 3.0 wt.%.

(2) Magnesium:

Magnesium (Mg) has an effect of improving erosion-corrosion resistance of an aluminum alloy, and this effect is particularly remarkable when Mg is contained in coexistence with Zn.

However, with an Mg content of under 0.2 wt.%, it is impossible to impart a desired erosion-corrosion resistance to the aluminum alloy. The Mg content should therefore be at least 0.2 wt.%. On the other hand, even with an Mg content of over 4.0 wt.%, no improvement is observed in erosion-corrosion resistance of the aluminum alloy. Furthermore, with an Mg content of over 4.0 wt.%, not only special considerations are required in manufacturing an aluminum alloy, but also the aluminum alloy becomes susceptible to an intergranular corrosion or an exfoliation. The Mg content should therefore be up to 4.0 wt.%.

(3) Manganese:

Manganese (Mn) has an effect of improving erosion-corrosion resistance of an aluminum alloy without impairing sacrificial anode property thereof, and this effect is particularly remarkable when Mn is contained in coexistence with Mg.

However, with an Mn content of under 0.3 wt.%, the above-mentioned effect cannot be obtained. On the other hand, even with an Mn content of over 2.0 wt.%, no improvement is observed in the above-mentioned effect. The Mn content should therefore be within the range of from 0.3 to 2.0 wt.%.

(4) Indium (In), tin (Sn) and bismuth (Bi):

Indium (In), tin (Sn) and bismuth (Bi) have an effect of improving sacrificial anode property of an aluminum alloy, and this effect is particularly remarkable when contained coexistence with Zn. In the aluminum alloy of the present invention, at least one of In, Sn and Bi should be added when it is necessary to place particular point on sacrificial anode property.

However, with an In content of under 0.005 wt.%, and Sn content of under 0.01 wt.% and a Bi content of under 0.01 wt.%, a desired effect as mentioned above cannot be obtained. On the other hand, with an In content of over 0.2 wt.%, an Sn content of over 0.3 wt.% and a Bi content of over 0.3 wt.%, and when two or more of In, Sn and Bi are contained, a total content of over 0.3 wt.% leads to a lower erosion-corrosion resistance of the aluminum alloy. Therefore, the In content should be within the range of from 0.005 to 0.2 wt.%, the Sn content, from 0.01 to 0.3 wt.%, the Bi content, from 0.01 to 0.3 wt.%, and the total content of In, Sn and Bi, up to 0.3 wt.%.

Now, the aluminum alloy of the present invention is described in more detail in comparison with reference aluminum alloys with reference to an example.

EXAMPLE

Ingots Nos. 1 to 5 of the aluminum alloy of the present invention and reference aluminum alloy ingots Nos. 1 to 5 with a length of 1,500 mm, a width of 900 mm and a thickness of 350 mm having the respective chemical compositions given in Table 1 were subjected to a soaking treatment by holding each of said ingots at a temperature of 550° C. for 24 hours, and then the both surfaces of each of said ingots were mechanically shaved by 5 mm.

The ten surface-shaved ingots of which the thickness was reduced to 340 mm were hot rolled at a temperature of 510° C. to a thickness of 6 mm, then cold rolled to a thickness of 2 mm, and then subjected to an annealing treatment by holding at a temperature of 400° C. for one hour. Thus, a 2-mm thick sheet was prepared for each of the aluminum alloys of the present invention (hereinafter referred to as the "alloys of the invention") Nos. 1 to 5 and the reference aluminum alloys (hereinafter referred to as the "reference alloys") Nos. 1 to 5.

In Table 1, the alloys of the invention Nos. 1 and 2 are aluminum alloys containing only Zn, Mg and Mn which are the indispensable constituent elements; the alloys of the invention Nos. 3 to 5 are aluminum alloys also containing In, Sn or Bi respectively which are the optional constituent elements; the reference alloys No. 1 is an aluminum alloy popularly used as an aluminum alloys for a sacrificial anode, which has a chemical composition corresponding to that of AA 7072 Al alloy described previously; the reference alloys Nos. 2 and 4 are aluminum alloys having a chemical composition in which In, Sn or Bi is added to the chemical composition of the reference alloy No. 1; and, the reference alloy No. 5 is not actually an alloy, but a pure aluminum with a purity of 99.0%.

TABLE 1

| Al alloy No. | Chemical composition (wt. %) | | | | | | | Weight loss by erosion-corrosion (mg) |
|---|---|---|---|---|---|---|---|---|
| | Zn | Mg | Mn | In | Sn | Bi | Al and incidental impurities | |
| Alloy 1 | 1.0 | 1.0 | 1.0 | — | — | — | Balance | 12.9 |
| of 2 | 1.5 | 1.0 | 1.0 | — | — | — | Balance | 12.8 |
| the 3 | 1.0 | 1.0 | 1.0 | 0.1 | — | — | Balance | 13.5 |
| inven-4 | 1.0 | 1.0 | 1.0 | — | 0.15 | — | Balance | 13.2 |
| tion 5 | 1.0 | 0.5 | 1.0 | — | — | 0.15 | Balance | 13.7 |
| 1 | 1.0 | — | — | — | — | — | Balance | 39.2 |
| Refer-2 | 1.0 | — | — | 0.1 | — | — | Balance | 38.9 |
| ence 3 | 1.0 | — | — | — | 0.15 | — | Balance | 39.7 |
| alloy 4 | 1.0 | — | — | — | — | 0.15 | Balance | 39.3 |

TABLE 1-continued

| Al alloy No. | Chemical composition (wt. %) | | | | | | | Weight loss by erosion-corrosion (mg) |
|---|---|---|---|---|---|---|---|---|
| | Zn | Mg | Mn | In | Sn | Bi | Al and incidental impurities | |
| 5 | — | — | — | — | — | — | Pure Al with a purity of 99.0% | 34.2 |

Then, test pieces each having a length of 50 mm, a width of 25 mm and a thickness of 2.0 mm were prepared respectively from the alloys of the invention Nos. 1 to 5 and the reference alloys Nos. 1 to 5, and an erosion-corrosion test based on a magnetostrictive oscillation method was carried out on each of said test pieces. Said erosion-corrosion test was conducted by bringing a surface of said test piece into contact with the surface of a supply-water bath, applying an ultrasonic oscillation with a frequency of 6,500± 50 cycles per second and an amplitude of 70 μm for 20 minutes, and then measuring the weight loss of said test piece caused by erosion-corrosion.

The results of said measurement are also indicated in Table 1. As is clear from the results of measurement given in Table 1, the weight loss of from 12.8 to 13.7 mg in the alloys of the invention Nos. 1 to 5 is so small as up to about a third that of from 34.2 to 39.7 mg in the reference alloys Nos. 1 to 5. Thus, the erosion-corrosion test based on the magnetostrictive oscillation method proved that the aluminum alloys of the present invention have a very excellent erosion-corrosion resistance.

Then, test pieces prepared in the same manner as in said erosion-corrsion test were subjected to another erosion-corrosion test based on a jet method. Said erosion-corrosion test was carried out by spraying an etching solution through a nozzle for a period of 312 hours to said test pieces at right angles under the following conditions, and then measuring the weight loss by erosion-corrosion in said test pieces:

Etching solution: 35% salt water,
Flow velocity of etching solution: 12.3 m/sec.,
Nozzle bore: 2 mm,
Distance between test piece and nozzle tip: 2 mm.

The results of said measurement are shown in Table 2.

TABLE 2

| Al alloy No. | Alloy of the invention | | | | | Reference alloy | | | | |
|---|---|---|---|---|---|---|---|---|---|---|
| | 1 | 2 | 3 | 4 | 5 | 1 | 2 | 3 | 4 | 5 |
| Weight loss by erosion-corrison (mg) | 80 | 76 | 81 | 80 | 79 | 443 | 452 | 447 | 455 | 245 |

As is evident from the results of measurement given in Table 2, the weight loss of from 76 to 81 mg in the alloys of the invention Nos. 1 to 5 is so small as up to about a third that of from 245 to 455 mg in the reference alloys Nos. 1 to 5. Thus, also the erosion-corrosion test based on the jet method proved that the aluminum alloys of the present invention have a very excellent erosion-corrosion resistance.

Then, pipes having a wall thickness of 0.5 mm and an outside diameter of 6 mm were prepared, which were cladded with aluminum alloys having respective chemical compositions as shown in Table 1 on the inner surface thereof to a thickness of 0.05 mm, and a heat exchanger was constructed with said pipes. Then, a 3.5% salt water at 90° C. was circulated at a flow velocity of from 1 to 5 m per second for a period of 500 hours through the pipes of said heat exchanger, and the occurrence of erosion-corrosion in said pipes was investigated. In a heat exchanger, the projection length of the pipe from the end plate has a close relationship with the occurrence of a turbulence: a longer projection length leads to an easier occurrence of turbulence. In the heat exchanger used in the investigation, therefore, a constant projection length of 5 mm was employed. The results of said investigation are given in Table 3.

TABLE 3

| Al alloy No. | | Flow velocity of salt water (m/sec.) | | | | | | | |
|---|---|---|---|---|---|---|---|---|---|
| | | 1.0 | 2.0 | 2.5 | 3.0 | 3.5 | 4.0 | 4.5 | 5.0 |
| Alloy of the invention | 1 | o | o | o | o | o | o | o | o |
| | 2 | o | o | o | o | o | o | o | o |
| | 3 | o | o | o | o | o | o | o | o |
| | 4 | o | o | o | o | o | o | o | o |
| | 5 | o | o | o | o | o | o | o | o |
| Reference alloy | 1 | o | o | o | o | x | x | x | x |
| | 2 | o | o | o | x | x | x | x | x |
| | 3 | o | o | o | x | x | x | x | x |
| | 4 | o | o | o | x | x | x | x | x |
| | 5 | o | o | o | o | o | x | x | x |

In Table 3, the mark "o" indicates that erosion-corrosion did not occur in the pipe, and the mark "x" indicates that erosion-corrosion occurred in the pipe.

As shown in Table 3, in the pipes cladded with the alloys of the invention Nos. 1 to 5, no erosion-corrosion occurred even at a flow velocity of salt water of 5 m per second. In contrast, in the pipes cladded with the reference alloys Nos. 1 to 5, erosion-corrosion was partially observed at a flow velocity of salt water of from 3 to 3.5 m per second, and erosion-corrosion was observed in all the pipes at a flow velocity of salt water of from 4 to 5 m per second. Thus, also the results of said investigation proved that the aluminum alloys of the present invention have a very exceilent erosion-corrosion resistance.

The aluminum alloys of the present invention have, as mentioned above in detail, a sacrificial anode property well comparable with that of the conventional aluminum alloys as well as an erosion-corrosion resistance far superior to that of the conventional aluminum alloys. Therefore, when, for example, a heat exchanger is constructed with pipes cladded with the aluminum alloy of the present invention on the inner surface thereof, no erosion-corrosion occurs in said pipes even with a liquid flowing at a high flow velocity through said pipes. It is therefore possible to reduce dimensions and weight of said heat exchanger and hence to reduce the manufacturing cost thereof, thus providing industrially useful effects.

What is claimed is:

1. An aluminum alloy for cladding excellent in sacrificial anode property and erosion-corrosion resistance, which consists essentially of, in weight percentage:
zinc: from 0.3 to 3.0%,
magnesium: from 0.2 to 2.5%,
manganese: from 0.3 to 2.0%,
at least one element from the group consisting of tin and bismuth each in an amount from 0.01 to 0.3% provided that the total content of tin and bismuth does not exceed 0.3% and,
the balance aluminum and incidental impurities.

* * * * *